Patented Aug. 10, 1937

2,089,201

UNITED STATES PATENT OFFICE 2,089,201

METHOD FOR VARYING THE SOLUBILITY OF CELLULOSE ACETATE

Georg Frank, Berlin, Germany, assignor to Hercules Powder Company, Wilmington, Del., a corporation of Delaware No Drawing. Application November 18, 1933, Serial No. 698,587. In Germany May 13, 1933

4 Claims. (Cl. 260—102)

This invention relates to a method for varying the solubility of cellulose acetates.

Cellulose acetate in fibrous form as heretofore produced by usual methods is disadvantageous in that it is insoluble in various commercial solvents, as acetone, a well known and widely used commercial solvent. Consequently, where solubility in commercial solvents, as acetone, has been desired, it has been the practice heretofore to vary its solubility by dissolving in acetic acid or other solvent with water, with or without a catalyst for hydrolysis, and then effect precipitation of the cellulose acetate by the addition of a nonsolvent, such as water. Such procedure is unsatisfactory and expensive in that it involves expensive procedure for the recovery of acetic acid from dilute solution. Again, chloroform or methylene chloride soluble fibrous cellulose acetate has been varied in solubility by treatment with relatively powerful reagents, such as mineral acids. However, such procedure is unsatisfactory, since hydrolytic decomposition of the cellulose acetate is likely to occur with yield of a product having unsatisfactory physical properties.

Now in accordance with this invention, it has been found that the solubility of fibrous cellulose acetate may be varied, without injury to the fibre or the production of a product of unsatisfactory physical properties, by heating the fibrous cellulose acetate with a dilute fatty acid.

Thus, in accordance with this invention a fibrous chloroform soluble cellulose acetate may be rendered soluble in acetone, without varying its physical structure, by heating with a dilute fatty acid.

In the practical adaptation of this invention, fibrous cellulose acetate may be prepared in any desired or well known manner, as by treating any suitable fibrous cellulose, as purified cotton linters, wood pulp, or the like, with acetic acid and esterifying with acetic anhydride. The fibrous cellulose acetate is then heated, as by boiling under reflux, with a fatty acid as, for example, formic acid, acetic acid, etc., in a dilute form, or with a fatty acid in dilute form and an agent which will swell the fibrous cellulose acetate, as calcium nitrate, calcium chloride, zinc chloride, or other suitable swelling agent. The fatty acid may be diluted with any suitable diluent which will be inert to the cellulose acetate. Water will be an efficient diluent.

As more specifically illustrative of the practical adaptation of this invention, cellulose acetate may be prepared by treating a fibrous cellulose with about 20 times its weight of a solution comprising 15% sulphuric acid and 85% acetic acid for a period of from thirty minutes to three hours. Then after the removal of excess of the solution, as by pressing or centrifuging, the mass is esterified with an excess of acetic anhydride diluted with, for example, 60% of carbon tetrachloride, until chloroform solubility, as determined by test, is obtained, or cellulose acetate may be prepared by treating air dried fibrous cellulose with 25 times its weight of a solution comprising 10% perchloric acid and 90% acetic acid, at room temperature, for a period of from thirty minutes to two hours, removing excess solution and esterifying the mass with acetic anhydride diluted, for example, with 70% of benzene.

Cellulose acetate prepared as indicated above, or by other suitable procedures, is then subjected to heating with a fatty acid. Thus, for example, 10 grams of fibrous cellulose acetate are covered with 150 grams of a solution of 8% formic acid in water and boiled under reflux for from 28 to 34 hours. The cellulose acetate so treated is washed and dried and will be found to be soluble in acetone.

As further illustrative, for example, 10 grams of fibrous cellulose acetate, prepared as indicated, covered with 200 grams of a solution of 15% formic acid in water are refluxed for about 15 hours, then washed and dried. The product will contain about 55–56.5% combined acetic acid and will be soluble in acetone. Again, 10 grams of fibrous cellulose acetate, prepared as above, may be rendered soluble in acetone by refluxing for about 30 hours with a 15% acetic acid-water solution.

When it is desired to use an agent to swell the fibrous cellulose acetate, for example, fibrous cellulose acetate, prepared as above, may be heated at about 105° C. for about 13 hours with a mixture of 65% crystallized calcium nitrate, 8% acetic acid and 27% water. After the heating period the calcium nitrate is removed by washing and the cellulose acetate dried. The product will be soluble in acetone.

It will be understood that the examples given herein are for the purpose of illustration only and that the conditions of temperature, time, fatty acid dilution, etc., may be widely varied without departing from the scope of this invention, which, as will be understood, contemplates broadly the treatment of cellulose acetate with heat in the presence of a fatty acid for varying its solubility.

What I claim and desire to protect by Letters Patent is:

1. The method for varying the solubility of fibrous cellulose acetate which includes heating fibrous cellulose acetate in the presence of a dilute aqueous solution of formic acid and calcium nitrate, said solution being incapable of dissolving the cellulose acetate.

2. The method for varying the solubility of fibrous cellulose acetate which includes heating fibrous cellulose acetate in the presence of a dilute aqueous solution of formic acid and an inorganic swelling agent for the cellulose acetate, said solution being incapable of dissolving the cellulose acetate.

3. The method for varying the solubility of fibrous cellulose acetate which includes heating fibrous cellulose acetate in the presence of a dilute aqueous solution of formic acid and calcium chloride, said solution being incapable of dissolving the cellulose acetate.

4. The method for varying the solubility of fibrous cellulose acetate which includes heating fibrous cellulose acetate in the presence of a dilute aqueous solution of formic acid and zinc chloride, said solution being incapable of dissolving the cellulose acetate.

GEORG FRANK.